J. M. CRABTREE.
CULTIVATOR.

No. 178,912. Patented June 20, 1876.

Witnesses.

Inventor:
John M. Crabtree
Per Burridge & Co.
Atty.

UNITED STATES PATENT OFFICE.

JOHN M. CRABTREE, OF WELLINGTON, OHIO.

IMPROVEMENT IN CULTIVATORS.

Specification forming part of Letters Patent No. 178,912, dated June 20, 1876; application filed February 21, 1876.

*To all whom it may concern:*

Be it known that I, JOHN M. CRABTREE, of Wellington, in the county of Loraine and State of Ohio, have invented certain new and useful Improvements in Cultivators; and I do hereby declare that the following is a full and complete description of the same, reference being had to the accompanying drawings, making part of this specification, in which—

Figure 1:
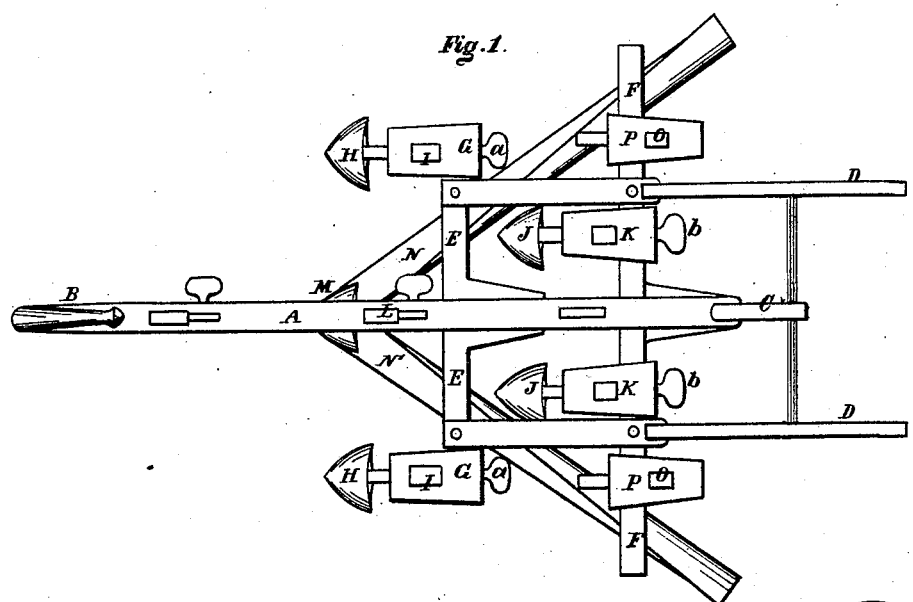
Figure 2:
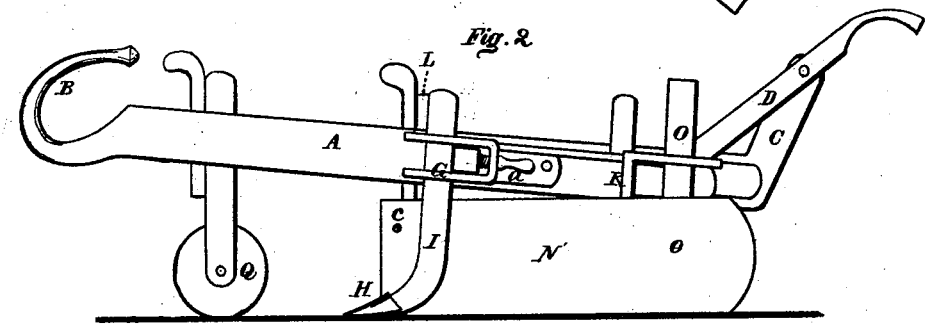
Figure 3:
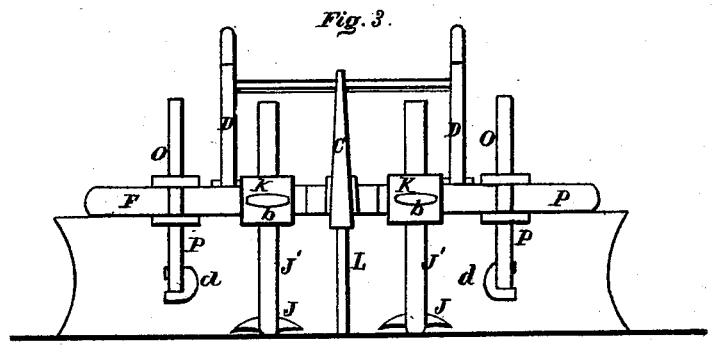

Figure 1 is a plan view of the cultivator. Fig. 2 is a side view. Fig. 3 is an end view.

Like letters of reference refer to like parts in the views presented.

This invention is a cultivator for the cultivation of corn, potatoes, and other crops, and for the cultivation of fallow-lands preparatory to seeding the same.

The construction of the cultivator is substantially as follows:

A represents the beam of the cultivator, the front end of which terminates in a hook, B, whereby it is drawn. The rear end of the beam terminates in a standard, C, for the support of the arms D of the implement. On each side of the beam is secured thereto a pair of arms, E F. To the extreme ends of the arms E are secured, by clips G, the feet or shares H, by means of the stem or shank I thereof passing through the clip, and held in place to the arms by the set-screw $a$, as shown in Figs. 1 and 2. To the arms F, in like manner, are secured the shares J, by the clips K, whereby the shanks J' of the shares are fastened to the arms, and bound thereto by the set-screw $b$. To the standard L and share M, Figs. 1 and 2, are secured, by a bolt, $c$, a pair of mold-boards, N N', of which the share M referred to forms the point, as will be seen in Fig. 1. The rear ends of the mold-boards are supported in place by standards O O, Fig. 3, attached to the arms F by a clip, P, and set-screw, as are the share-standards. The lower ends of the standards O O terminate in hooks, and are caught in eyes $d$, Fig. 3, secured to the inside of the mold-boards, whereby they are firmly retained in position, as shown in the drawings.

As above said, this machine is for either cultivating growing plants or for preparing the ground for seeding. In the event it is used for the former purpose, it should be with the mold-boards attached, as shown in the drawings.

While the three front shares H H M stir up the ground, the loosened dirt is thrown by the mold-boards against the plants. The depth that the ground is stirred is governed by the roller Q. The almost horizontal position of the shares causes them to run lightly and without much depth in the ground, cutting the weeds and stirring the surface of the ground only.

The mold-boards can be narrowed in or spread apart as the width of the rows may require by shifting the clips P on the arms.

When the implement is used for cultivating fallow, the mold-boards are to be detached, and the several shares adjusted on their respective arms, as may be desired, for coarse or fine work.

What I claim as my invention, and desire to secure by Letters Patent, is—

In cultivators, the vertically and horizontally adjustable mold-boards N N, in combination with the vertically and horizontally adjustable shares J J and adjustable pilot-wheel Q, substantially as and for the purpose set forth.

JOHN M. CRABTREE.

Witnesses:
J. H. BURRIDGE,
E. W. CROSS.